No. 859,056. PATENTED JULY 2, 1907.
T. C. FOLSOM.
RAIL BOND.
APPLICATION FILED OCT. 23, 1906.

Witnesses
Inventor.
T. C. Folsom,
Attorneys.

UNITED STATES PATENT OFFICE.

THOMAS C. FOLSOM, OF TAMPA, FLORIDA.

RAIL-BOND.

No. 859,056.  Specification of Letters Patent.  Patented July 2, 1907.

Application filed October 23, 1906. Serial No. 340,199.

*To all whom it may concern:*

Be it known that I, THOMAS C. FOLSOM, a citizen of the United States, residing at Tampa, in the county of Hillsboro and State of Florida, have invented certain new and useful Improvements in Rail-Bonds; and I do hereby declare the following to be a full, clear, and exact description of the invention, such as will enable others skilled in the art to which it appertains to make and use the same.
My invention relates to improvements in rail bonds for electrically connecting contiguous rails, and it consists in providing a bond which will be securely held in place in a protected position, but which may be readily applied and removed when desired.
My invention will be understood by reference to the accompanying drawings, in which the same parts are indicated by the same letters throughout the several views.

Figure 1:
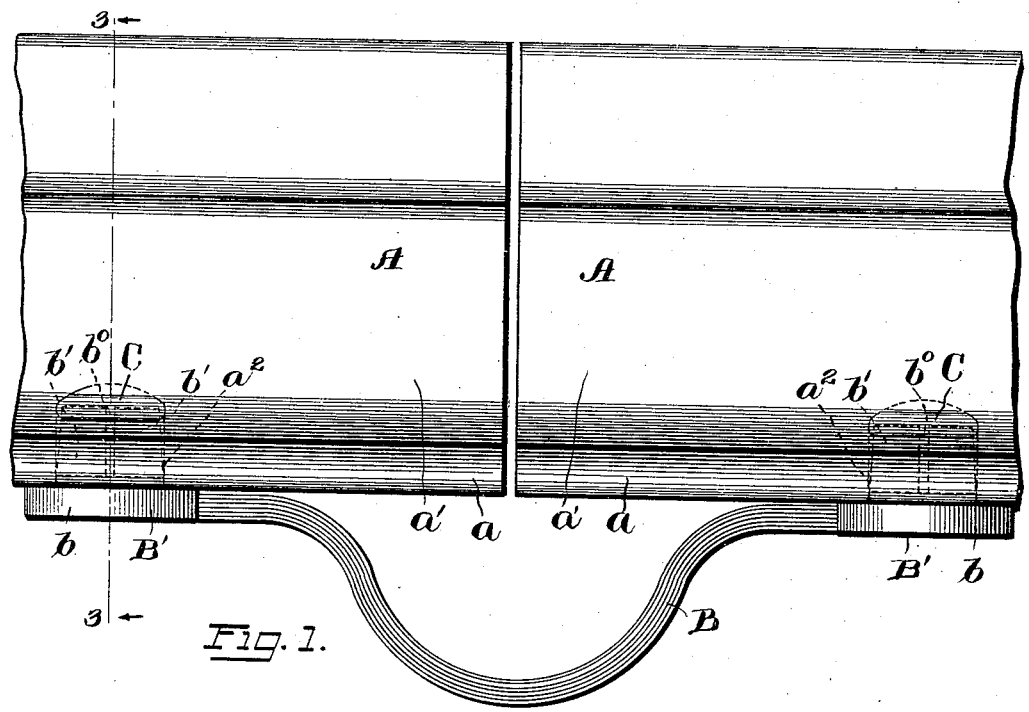
Figure 2:
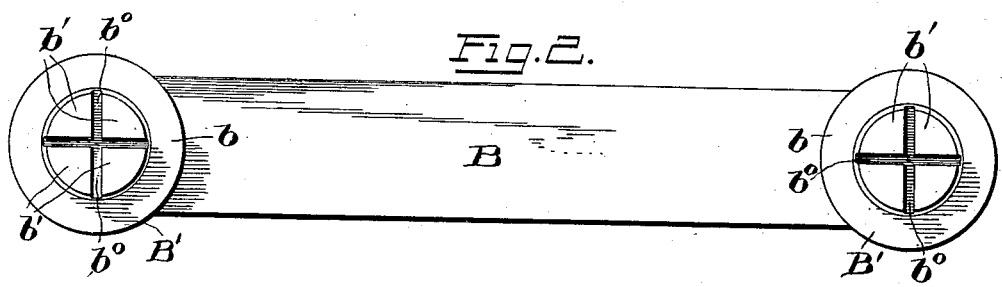
Figure 3:
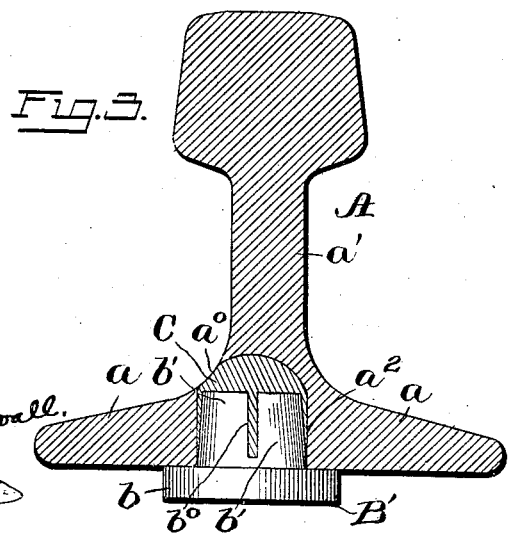

Figure 1 is a side elevation showing the abutting ends of two rails with the bond in place. Fig. 2 is a detail showing the bond detached, and Fig. 3 shows a section along the line 3—3 of Fig. 1, looking in the direction of the arrows.

A represents an ordinary rail having flanges $a$ and web $a'$.

B represents the bond, which is preferably composed of a plurality of laminated strips of conducting material, such as copper, which strips are secured to, or integral with, the terminals B'. Preferably these terminals are made integral with the strips, which may be done by doubling up the ends of the strips and forcing the same into a die of the required shape. These terminals B' are provided with a flanged head $b$ and with a tongue, which is preferably slotted, as at $b^0$, to form a plurality of segments $b'$. The rail is bored out, as at $a^2$, from the bottom upwards, as shown in Fig. 3, and preferably at one side of the center line, so that there shall be a small opening $a^0$ at one side of the web $a'$. The tongue of the terminal B' is inserted in the opening $a^2$, as shown in Fig. 3, and is temporarily clamped to the rail, and acid is poured on the rail and the bond terminal and into the slots. The rail is then heated up by a blow torch to the desired temperature, and then melted solder is poured into the opening $a^0$ filling the cavity in the bottom of the rail, as shown at C in Fig. 3, and also filling the slots $b^0$ in the ends of the bond. The torch is then applied to drive off impurities and the solder is then allowed to cool, or it may be chilled by throwing water on the rail, and the clamps are removed.
When the solder solidifies the terminal is held securely in place and in thorough electric connection with the rail. It is also held on the underside of the rail, where it is largely protected from moisture, and also from accidental injury.
In order to remove the terminal, it is simply necessary to heat the joint to a sufficient temperature to melt the solder, when the terminal will drop out of engagement with the rail. This may be done with a blow torch, well known in the art.

It will be noted that the tongue has a slight taper and the slots $b^0$ do not extend all the way to the flange $b$. This construction prevents the solder from running out past the said flange when it is poured in through the opening $a^0$. It will be seen that the solder forms a water tight seal for the joint.

While I prefer solder, because it is so readily fusible and is at the same time a good conductor, it will be obvious that any other suitable fusible conducting material may be used instead of solder, if desired.

While I prefer to have the cavity in the rail projecting upward from beneath for the reasons set forth, it will be obvious that said cavity may be provided in any portion of the rail, and may be located at any angle.

It will be obvious that any style of electrical conductor may be used to connect pairs of terminals, but I prefer a laminated conductor B, of the type herein described and claimed. It will be noted that the bond when removed by heating the terminal, as aforesaid, is not in any way injured in the removal, and may be used over and over again, if desired.

It will be obvious that the bond may be used with any size or style of rails, and that the dimensions of the terminals and of the connecting conductor may be varied to suit varying conditions.

Having thus described my invention, what I claim and desire to secure by Letters Patent of the United States, is:—

1. In a rail bond, the combination with a rail provided with an upwardly extending cavity in its base, said cavity opening at one side of the web, of a terminal having a flanged head and a slotted tongue projecting into said cavity and closing the bottom thereof, and a mass of fusible conducting material filling said cavity and said slots and locking said tongue in place, substantially as described.

2. In a rail bond, the combination with a rail having an upwardly projecting cavity in its base, said cavity opening upwards through one of the flanges of the rail, a terminal having a slotted tapered tongue fitting in said cavity and closing the bottom thereof, and a mass of solder filling said cavity and the slotted portion of said tongue and locking the same in place, substantially as described.

3. In a rail bond, the combination with a rail having an upwardly extending cavity in its base, said cavity opening through one of the flanges of the rail, a tapered bond projected into said cavity and closing the bottoms thereof, and a mass of fusible conducting material poured into said cavity and locking said bond in place when cooled, substantially as described.

4. In a rail bond, the combination with a rail provided with a cylindrical cavity having a small opening at its further end, of a terminal having a flanged head and a slotted tongue projecting into said cavity and closing the bottom thereof, and a mass of fusible conducting material filling said cavity and said slots and locking said tongue in place, substantially as described.

5. In a rail bond, the combination with a rail provided with a cylindrical cavity having a small opening at its further end, a terminal having a slotted tapered tongue fitting in said cavity and closing the bottom thereof, and a mass of solder filling said cavity and the slotted portion of said tongue and locking the same in place, substantially as described.

6. In a rail bond, the combination with a rail provided with a cylindrical cavity having a small opening at its further end, a tapered bond projected into said cavity and closing the bottoms thereof, and a mass of fusible conducting material poured into said cavity and locking said bond in place when cooled, substantially as described.

In testimony whereof, I affix my signature, in presence of two witnesses.

THOMAS C. FOLSOM.

Witnesses:
 A. L. HOUGH,
 MYRON G. CLEAR.